Nov. 3, 1936.                C. SAUZEDDE                2,059,281
FLUID DISTRIBUTING AND BLEEDER VALVE COMBINATION FOR HYDRAULIC BRAKES
Filed Oct. 8, 1931
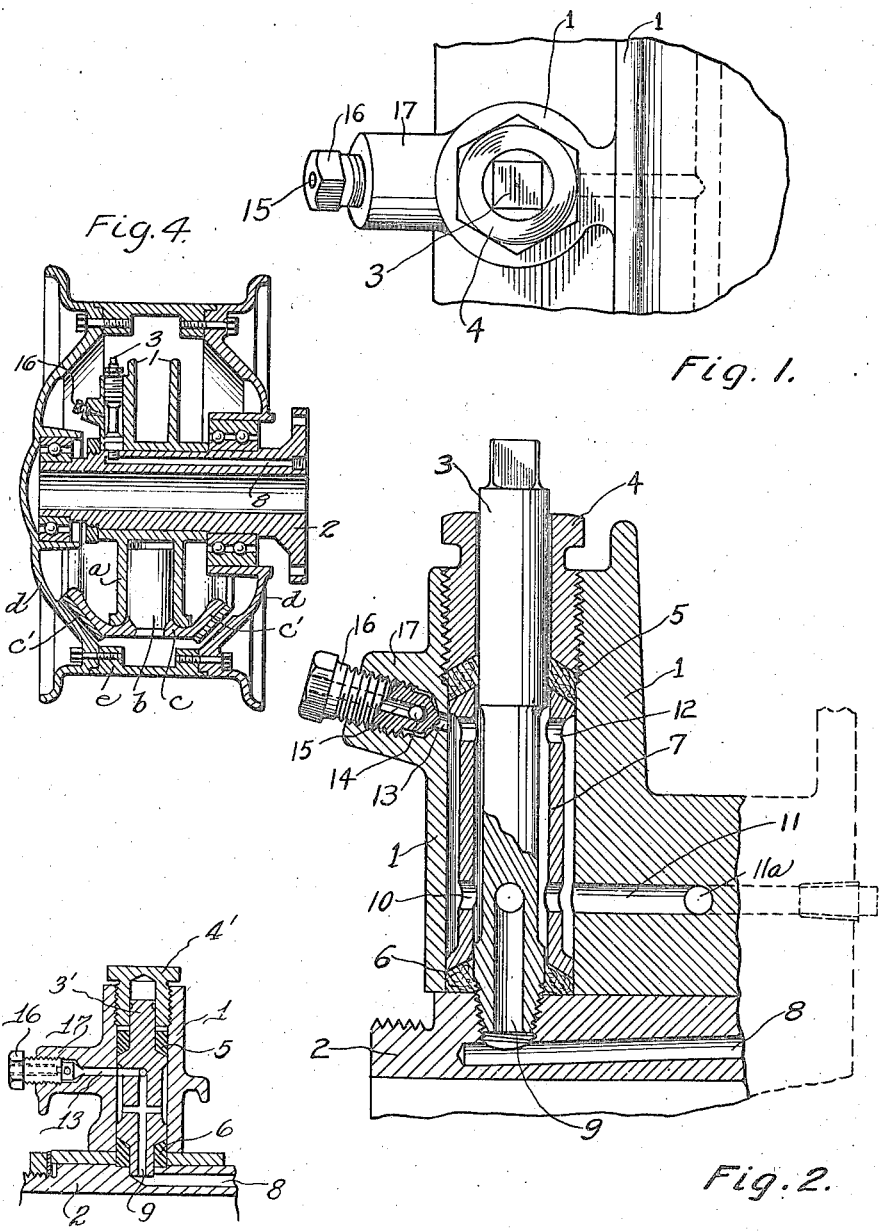
INVENTOR
Claude Sauzedde
BY
ATTORNEYS Patented Nov. 3, 1936

2,059,281

UNITED STATES PATENT OFFICE 2,059,281

FLUID-DISTRIBUTING AND BLEEDER-VALVE COMBINATION FOR HYDRAULIC BRAKES

Claude Sauzedde, Detroit, Mich., assignor to Detroit Hydrostatic Brake Corporation, Detroit, Mich., a corporation of Michigan Application October 8, 1931, Serial No. 567,671

3 Claims. (Cl. 188—152)

The present invention relates to hydrostatic braking systems, and especially to systems wherein the fluid employed is subjected to high pressure conditions, the invention relating more particularly to a fluid distributing and bleeder unit employed in such system to permit ready elimination of any air which may be present within the system.

In hydraulic braking systems, especially of the high pressure type, and where, as is generally the case, the system utilizes more than a single fluid line in reaching from the source of fluid pressure supply to the individual braking mechanisms, the presence of air—itself compressible—within any of the lines can set up unequal braking pressures, since the line or lines which do not have the air content can provide the full braking pressure through the non-elastic fluid employed, while the line or lines carrying trapped air, would permit compression of the air and thus reduce the effect of the source pressure at the braking point or points. For this reason the lines are generally relieved of any trapped air which may be present.

Where the braking system utilizes the brake mechanism as of the internal type—as shown, for instance, in my companion application, Serial No. 440,276, now Patent No. 2,008,728, issued July 23, 1935—the difficulties of providing such relief of trapped air are materially increased, since the brake mechanism is enclosed and utilizes pistons movable radially with the fluid channels comparatively small as is the chamber which carries the fluid for actuating the pistons. Hence, it is more or less essential that the bleeder unit be so located as to practically operate as a collector of trapped air within the fluid—or when the fluid is first introduced into the system—in order to permit the air to be readily removed from the system. And since this is especially true with respect to the portion of the system that is within the wheel being braked, the location is preferably such as to be readily accessible to the fluid within the channels at this point.

It is to meet conditions such as this that the present invention has been designed, the unit being of a simple form and located in the wheel itself adjacent to and presenting a part of the fluid supply channel to the brake mechanism within the wheel, the unit ensuring efficient distribution of fluid, and at the same time ensuring that loss of fluid pressure will be prevented.

To these and other ends, therefore, the nature of which will be made more apparent as the disclosure proceeds, said invention consists in the improved construction and combination of parts as more particularly described in the specification, illustrated in the accompanying drawing, and more particularly pointed out in the appended claims.

In the accompanying drawing, in which similar reference characters indicate similar parts in each of the views,—

Figure 1 is a top plan view, and Fig. 2 is a vertical sectional view of one form of a distributing and bleeder unit, as applied to a braking system of the general type indicated.

Fig. 3 is a vertical sectional view showing a modified form of the unit, and

Fig. 4 is a central sectional view of a wheel assembly taken on a plane corresponding to the direction of length of the wheel axis, the unit shown being that of the form of Fig. 2.

Two forms of the unit are disclosed herein, that shown in Figure 3 is disclosed as a part of the disclosure in my companion applications, Serial Nos. 575,841 and 590,054, the preferred form shown in Figs. 1 and 2 being shown applied to a wheel assembly in Fig. 4 herein, the latter presenting, in simple form, the general characteristics of a wheel assembly carrying a brake mechanism of the general type referred to. Fig. 4 can thus be considered as representative of the general type to which the unit can be applied. To permit a clearer understanding to be had, a brief description of the brake mechanism of Fig. 4 will now be given.

The wheel assembly of Fig. 4 is assumed to employ three sets of brake shoe elements, each set being movable radially into braking position, the sets being arranged symmetrically and equally-spaced about the wheel axis. In Fig. 4 the lower half of the view presents one of the sets in section, the section of the view placing the remaining sets beyond the line of section—the bleeder unit is preferably located between sets, and hence is shown as located on the line of section at the upper half of the view.

As indicated, the wheel axle is indicated at 2, this being shown as a stub axle, and carries a channel 8 connected to a source of fluid pressure supply, not shown. The axle 2 carries a spider 4 secured thereto to form a part of the non-rotative part of the braking mechanism. As indicated in the lower half of the view, the spider is arranged to provide a form of radially-extending cylinder formation $a$, open at its outer end, and closed at its inner end excepting for a port which enters the cylinder space through the inner wall of the cylinder space and which is a part of the channel system. The cylinder receives a piston $b$ the outer end of which supports a brake-shoe element $c$, the latter carrying two segmental brake-shoes $c'$ adapted to co-operate with braking surfaces carried by the side members $d$ of the wheel, the latter members being connected by an annular spacing element $e$ to set up the conditions of a closed housing for the braking mechanism.

As pointed out, the arrangement shown utilizes three of such brake-shoe actuating units with the units equally spaced. The inner ends of the several cylinders are in open communication with the fluid system—represented by channel 11 in this view—through ducts or channels connecting adjacent cylinders and which are indicated in Fig. 2 by the duct 11a, these ducts being carried by the spider. Hence, when the actuator is operated to provide fluid movement to force the pistons outward, such outward movement will be concurrent in all of the actuating units, thus applying the braking segments to the braking surfaces of the wheel. The brake-shoe elements are interlinked by springs (not shown, but indicated for instance in the patent above identified) to cause return of the braking elements to inactive position when the source actuator is moved to permit such action.

As shown by the line of section of Fig. 4, the structure of the bleeder unit of Fig. 2 or 3 is preferably located intermediate the two units not specifically shown—and opposite the unit shown in Fig. 4—and thus places the distributing and bleeder valve unit at an upper point in the fluid system. As a result, air which may be present in the fluid system after the same has been filled, will tend to pass to this point of the system—a condition that is also true during the period when the system is being initially filled with the fluid, the location being such that trapping of air will be likely to take place in the zone indicated and will also permit of the free passage of the fluid to the channel system of the spider and permit escape of air during the system filling operation. Trapped air is readily removed as presently indicated.

As shown, the unit is located as an element which connects the channel 8 of the stub-axle and the channel system of the spider indicated by channel 11 in Fig. 2, and therefore is located in position to be common to the entire channel system of the spider. As a result, the fluid transfer which takes place in setting and releasing the brakes, must necessarily be present within the bleeder unit itself. Hence, under conditions of high pressure application, it is essential that the structure be connected up in such manner as will ensure the maintenance of the pressure conditions.

The preferred form of bleeder unit is shown in Figs. 1 and 2, in which 1 indicates a projection of the spider, the projection having a bore extending radially of the spider, with the axis of the bore intersecting the channel 8 of the stub-shaft 2, the latter having a threaded opening, preferably tapered, leading in the direction of the bore axis and being designed to receive the threaded lower end of an elongated plug or stem 3, having a length to extend beyond the upper end of the projection and being provided with a wrench hold at its upper end to enable the plug or stem to be threaded tightly to the threads of the tapered opening of the axle. The plug is of less diameter than the bore of the projection, a packing gland 4, threaded into the upper end of the bore, serving to maintain the plug with its axis in the bore axis. The lower end zone of the plug carries an axial opening 9 leading substantially to the zone of channel 11, the plug having a lateral through opening intersecting the inner end of opening 9. Through opening 9 and its through opening of the plug, the channel 8 is opened to the exterior of the stem in the vicinity of channel 11 enabling passage of fluid between channel 8 and channel 11 of the spider.

7 indicates a sleeve within the projection bore, annular with respect to the stem, and having a length less than the distance between the gland 4 and the axle 2, the ends of the sleeve being formed conical to co-operate with suitable packing elements 5 and 6 which are interposed between the sleeve ends and the gland and axle respectively. Hence, when the gland 4 is threaded tightly to position it serves to clamp the sleeve between the packings 5 and 6, with the latter also packing the exterior of the plug 3 at the points where these packings are located. The sleeve has its end zones of sufficient diameter to fit the bore wall, but intermediate the end zones the sleeve is of reduced diameter, so that in such intermediate zone the sleeve tends to function as a partition between the wall of the bore and the plug 3, this effect being enhanced by the fact that the plug 3 is also of reduced diameter within the sleeve zone. As a result the space between the plug and bore wall is divided into two annular spaces by the sleeve, one space being between the plug and the sleeve with the other space located between the sleeve and the bore wall. The sleeve is also provided with openings 10 in the zone of the channel 11, thus opening communication between these spaces at this point; in addition, the sleeve is provided with openings 12 within the sleeve end zone remote from openings 10, thus connecting the spaces remote from the openings 10.

The unit is completed by a valve structure 16 having a threaded connection with a threaded opening formed in a lug 17 carried by the projection in the zone of the upper end of the sleeve, the threaded opening of lug 17 having a ported connection with the outer annular space through a restricted opening 13, the outer end of the wall of which is arranged to provide a seating face for the inner conical end of valve 16 when the latter is threaded to carry its conical end into contact with the seat and thus close the opening 13. The valve has a reduced inner end zone, so that when the valve is unscrewed, the space between the inner end zone of the valve and the wall of the threaded opening of the lug 17 is placed in open communication with the outer annular space, which communication then reaches the outer atmosphere through a lateral passage 14 of the valve and an axial opening of the latter leading to the outer end of the valve. Hence, when the valve is opened by unscrewing a desired distance, an open passageway is provided between the outer annular space and the exterior of the valve; when the valve is seated, port 13 is closed, thus isolating the annular space from the atmosphere.

Of the parts referred to, none are designed for movement, after installation, excepting the valve 16.

As will be apparent, the unit, when assembled, permits free passage of the fluid from channel 8 into the spider channel system 11 through opening 9 into the inner annular space and, through openings 10 and 12 into the outer annular space; and since the latter is open communication with the channel system 11, free passage of fluid will be provided to and from the channel system and consequently to the fluid chambers at the inner ends of the pistons b. These will be the normal operating conditions of the unit. Valve 16 is opened when it is desired to permit the escape of air from the system when the latter is being charged with the fluid, or to remove trapped air from the system, the valve having a suitable wrench-hold surface to enable an operating tool to be used.

With the assembly installed, valve 16 is opened and the fluid introduced in the system in suitable manner at a point other than through valve-controlled port 13. As the fluid advances, the air content is driven out through the opened port 13, this including the air in the channel system. Since port 13 is located at the highest part of the system within the wheel, it can be understood that when fluid appears at the outlet of valve 16, the system will have been cleared of air, and the valve is then closed.

In this result, the sleeve 7 performs a service as can be readily understood. The fluid first enters the inner annular space, passing through openings 10 into the outer annular space where it has access to the channel system, the course thus being somewhat tortuous, since openings 10 are arranged so that the through port in the plug 3 will extend angular to the axis of these openings. With valve 16 open, the air can freely pass out and this will continue until the channel system has been filled, thus setting up resistance so that the additional fluid must travel outwardly within the annular spaces as the latter become filled, the openings 12 ensuring that the air of both spaces will be eliminated.

In service, the fluid system requires replenishing from time to time, and it is possible that air may pass into the system during such period, or even that trapped air may be found in the fluid itself. In either event, it can be readily understood that operation of the system over a period will cause this trapped air to be moved in the direction of the channel system, and since the arrangement provides for a somewhat tortuous course, and since the upper ends of the annular spaces are at the highest point, the air will be gradually collected at the upper ends of these spaces, and hence can be permitted to escape by opening valve 16 for the purpose.

As will be understood, the conditions of the service tend to render the unit of material value when located at this point. When the brakes are being set the actuator of the fluid is operating at one end of fluid path while the brake shoes are brought into contact with the braking surfaces to set up a resistance against further advance of the pistons. Hence, the fluid path is being subjected to opposing pressures at its opposite ends, with the result that the fluid in the path becomes subject to this pressure. While the inner and outer annular spaces of the unit are also filled with the fluid, the upper ends of the spaces are out of the direct path of pressure with the result that trapped air will tend to gradually accumulate at such point and thus be accessible to the valve 16. Since the unit is located in the vicinity of the channel system of the spider, and the passageways are comparatively small, it can be understood that the structure becomes of definite value for the purpose since the small stream effect is especially conducive to release of entrained air within the fluid line. With the entire system so arranged as to utilize a minimum amount of fluid, the addition of the unit is of value in that it requires but a small additional amount of fluid within the fluid line to make the unit effective.

The form of unit shown in Fig. 3 differs to some extent from that disclosed in Fig. 2, the distinction being mainly in the form of the plug 3 and the omission of the sleeve 7. The plug 3' does not extend through the gland 4' but is guided by it, with the plug carrying the conical surfaces which co-operate with the packings 5 and 6. The plug has a major diameter to fit the bore of the projection, and is formed with an intermediate zone of reduced diameter thus forming a single annular space between it and the wall of the bore. The opening 9 is lengthened so as to extend to the zone of the port 13, so that the inner annular space action of Fig. 2 is provided by the opening 9. The accumulation of entrapped air will be found at the upper end of the opening 9 and the upper end of the annular space and the connection between the opening 9 at this point and the space. In other words, the plug of Fig. 3 practically combines the plug and sleeve of Fig. 2 into a single element. In action it is generally similar to the action of the unit of Fig. 2 with the exception that the omission of the inner annular space and its substitution by the axial opening may lessen the tortuous channel effect that is present in the form of Fig. 2.

As will be obvious, the presence of the unit in the assembly will tend to lock the spider against ready removal, so that if the spider is to be removed, the bleeder unit should first be disassembled.

Having described my invention with sufficient clarity to enable persons skilled in the art to which it relates to understand and make practical application of it, I claim:

1. In hydrostatically-actuated brake systems, wherein the system includes a plurality of brake shoe members concurrently movable to braking activity relative to braking surfaces carried by a wheel by fluid pressure applied through pressure-translating mechanism, wherein the system includes a spider carried by a shaft or spindle to form a support for the brake shoe members, and wherein the shaft or spindle and the spider respectively carry channels forming a portion of the fluid communication between a source of fluid pressure supply included in the system and the pressure-translating mechanism, means for completing such communication channel, said means including a tubular member carried by the spider, a plug therein and extending axially thereof, said plug extending into the shaft or spindle and having an axial channel in communication with the channel of the shaft or spindle, a port connecting the axial channel with an elongated annular chamber external of the plug, said chamber having open communication with the spider channel, and means carried by the tubular member for bleeding the chamber at will, said latter means including a bleeder valve mounted in the tubular member to control a port leading from the outer end of the annular chamber, said valve being movable rotatively between open and closed positions, whereby entrapped air of the hydrostatic fluid system may be eliminated by bleeder valve manipulation.

2. Means as in claim 1, characterized in that packing between the plug and tubular member at opposite ends of the annular chamber prevents communication between shaft or spindle channel and the chamber excepting through the plug and prevents escape of chamber contents externally of the tubular member excepting as permitted by bleeder valve manipulation.

3. Means as in claim 1 characterized by a ported annular member between the plug and tubular member within the chamber, packing at the opposite ends of the annular member, and a gland member threaded to the tubular member beyond the outer packing, whereby adjustment of the gland member serves to properly pack the opposite ends of the annular chamber.

CLAUDE SAUZEDDE.